(12) United States Patent
Adachi et al.

(10) Patent No.: US 7,367,603 B2
(45) Date of Patent: May 6, 2008

(54) HEADREST, SEAT FOR VEHICLE, AND METHOD FOR MANUFACTURING HEADREST

(75) Inventors: Shigeru Adachi, Tochigi (JP); Shuichi Hashiguchi, Tochigi (JP); Masami Yoshida, Tochigi (JP)

(73) Assignee: TS Tech Co., Ltd. (JP)

( * ) Notice: Subject to any disclaimer, the term of this patent is extended or adjusted under 35 U.S.C. 154(b) by 247 days.

(21) Appl. No.: 11/280,575

(22) Filed: Nov. 16, 2005

(65) Prior Publication Data
US 2007/0108804 A1    May 17, 2007

(51) Int. Cl.
*B60N 2/48* (2006.01)

(52) U.S. Cl. ......................................... 296/63; 297/391

(58) Field of Classification Search .................. 296/63; 297/91, 391, 396, 405, 404, 403, 399–402, 297/397
See application file for complete search history.

(56) References Cited

U.S. PATENT DOCUMENTS

| | | | | |
|---|---|---|---|---|
| 5,405,190 A | * | 4/1995 | Jeffcoat et al. | 297/391 |
| 5,927,814 A | * | 7/1999 | Yoshimura | 297/391 |
| 5,967,612 A | * | 10/1999 | Takei | 297/391 |
| 5,984,414 A | * | 11/1999 | Adachi et al. | 297/391 |
| 6,056,358 A | * | 5/2000 | De Filippo | 297/220 |
| 6,637,822 B1 | * | 10/2003 | Kato | 297/397 |
| 2004/0113479 A1 | * | 6/2004 | Jost | 297/391 |
| 2007/0176479 A1 | * | 8/2007 | Tabata | 297/391 |

FOREIGN PATENT DOCUMENTS

| | | | |
|---|---|---|---|
| GB | 2040675 A | * | 2/1979 |
| JP | 10-71047 | | 3/1998 |
| JP | 2002-336077 | | 11/2002 |
| JP | 2002-336078 | | 11/2002 |

* cited by examiner

*Primary Examiner*—Jason S Morrow
(74) *Attorney, Agent, or Firm*—Schiff Hardin LLP

(57) ABSTRACT

In a bored headrest, a garnish includes a front garnish and a rear garnish that are attached to a through-hole of a skin member in front and rear directions of the through-hole to seal an opening. The front garnish has a first holding portion that can hold a first skin edge portion, and a first connecting portion formed at a near side to the rear garnish. The rear garnish has a second holding portion which can hold a second skin edge portion, and a second connecting portion formed at a near side to the front garnish. The rear garnish has a second connecting portion. Therefore, a bored headrest is provided having a high quality of appearance and whose quality of appearance can be kept constant.

11 Claims, 7 Drawing Sheets

HEADREST, SEAT FOR VEHICLE, AND METHOD FOR MANUFACTURING HEADREST

BACKGROUND

The present invention relates to a headrest, a seat for a vehicle, and a method for manufacturing a headrest, and in particular to a bored head rest having a through-hole extending through the headrest in front and rear directions of a seat (in a longitudinal direction of a vehicle), where a garnish is attached to the through-hole, a seat for a vehicle using the bored headrest, and a method for manufacturing a bored headrest.

Conventionally, as a headrest of a seat for a vehicle, a headrest of a bored type having a through-hole extending through the headrest in a longitudinal direction of the vehicle where a garnish is attached to the through-hole has been known (see Japanese patent document no. JP-A-10-71047, pages 2 to 3 of the text and FIGS. 1 to 4).

In a headrest described in JP-A-10-71047, for example, a through-hole extending through the headrest in a longitudinal direction of a vehicle is formed at a central portion of a skin member and an annular opening is formed at skin edge portions of the skin member forming the through-hole along a circumferential direction of the through-hole. A garnish is provided with an insertion piece portion inserted into the opening of the skin member and an abutting piece portion formed integrally with the insertion piece portion to abut on the skin edge portions defining the opening.

For assembling the bored headrest constituted above, the insertion piece portion of the garnish is first inserted into the opening of the skin member so that the garnish is attached to the through-hole of the skin member, and stock solution of foaming resin is poured inside the skin member from a resin pouring port provided in the skin member in this state. The stock solution of foaming resin poured inside the skin member is foamed so that a cushion member is formed inside the skin member.

When the cushion member is formed inside the skin member, the skin edge portions defining the opening of the skin member is pressed on the abutting piece portion of the garnish by the foamed cushion member. Thereby, the skin member, the cushion member, and the garnish are united so that a headrest is completed.

Therefore, appearance of the through-hole of the headrest can be made excellent by attaching the garnish to the through-hole of the headrest.

Incidentally, bored headrests of this type with such a garnish include a bored headrest having a structure where a garnish has been divided into two pieces in a longitudinal direction of a vehicle (for example, see Japanese patent document no. JP-A-2002-336077).

For example, a bored headrest described in JP-A-2002-336077 is constructed such that a garnish has a pair of garnish pieces divided in a longitudinal direction of a vehicle and the pair of garnish pieces are respectively fitted to a through-hole formed at a central portion of the headrest from a front direction and a rear direction of the vehicle.

By using the garnish having the structure divided in the longitudinal direction of a vehicle in this manner, assembling of the garnish to the through-hole of the headrest can be completed by simply fitting the pair of garnish pieces to the through-hole of the headrest from the front and rear directions of the vehicle, so that assembly of the garnish to the headrest can be improved.

However, the construction as described in JP-A-10-71047, in which the insertion piece portion of the garnish is inserted into the opening of the skin member, since the opening of the skin member is formed at a depth portion of the through-hole, a troublesome amount of work is required for inserting the insertion piece portion of the garnish into the opening of the skin member. Accordingly, in a working site for assembling the headrest, there is a demand for a construction that allows an easy attachment of the garnish to the through-hole of the skin member.

In the headrest described in JP-A-10-71047, since it is difficult to position the skin edge portions of the skin member defining the opening of the skin member to the abutting piece portion of the garish, there is a possibility that, when the garnish is attached to the through-hole of the skin member by an unskilled worker, wrinkles and/or slacking portions occur at the skin edge portion defining the opening.

There is a possibility that, when foaming resin is foamed inside the skin member in such a state that there are wrinkles or slacking portions at the skin edge portions defining the opening described above, the headrest is finished including wrinkles or slacking portions thereof.

Therefore, in the headrest described in JP-A-10-71047, since variations easily occur in finishing of the skin edge portion defining the opening due to differences in skill among individual workers, it is difficult to keep the appearance quality of the respective headrests constant.

As described in JP-A-2002-336077, though the headrest constructed such that the garnish pieces divided in the longitudinal direction of a vehicle are fitted to the through-hole of the headrest from the front and rear directions of a vehicle has been proposed, the above problem can not be solved yet by this proposal.

SUMMARY

In view of these circumstances, the present invention has been made, and an object thereof is to provide a headrest with a high appearance quality.

Another object of the present invention is to provide a headrest with a constant appearance quality.

Another object of the present invention is to provide a seat for a vehicle having a headrest with a high appearance quality.

Another object of the present invention is to provide a seat for a vehicle having a headrest with a constant appearance quality.

Another object of the present invention is to provide a method for manufacturing a headrest with a high appearance quality.

Another object of the present invention is to provide a method for manufacturing a headrest with a constant appearance quality.

According to a first aspect of an embodiment of the present invention, the problem can be solved by providing a bored headrest where a cushion member and a frame are covered with a skin member having a through-hole extending in front and rear directions of the headrest, and a front garnish and a rear garnish are attached to the through-hole from the front and rear directions, wherein an opening is formed at skin edge portions forming the through-hole of the skin member along a circumferential direction of the through-hole; the front garnish has a first holding portion which can hold a first skin edge portion which is one of the skin edge portions between which the opening is interposed; and the rear garnish has a second holding portion which can hold a second skin edge portion which is the other of the skin edge portions between which the opening is interposed; and the front garnish and the rear garnish are fixedly connected to each other inside the through-hole and seal the opening.

Thus, this headrest is provided with the front garnish and the rear garnish which are attached to the through-hole formed in the skin member from the front and rear directions, where the front garnish has the first holding portion which can hold the first skin edge portion which is one of the skin edge portions between which the opening is interposed, and the rear garnish has the second holding portion which can hold the second skin edge portion which is the other of the skin edge portions between which the opening is interposed.

Since the front garnish and the rear garnish are fixedly connected to each other inside the through-hole, attaching of the front and rear garnishes to the through-hole of the skin member can be conducted simply, for example, by pulling the first skin edge portion and the second skin edge portion from the through-hole to the outside, causing the front garnish and the rear garnish to hold the first skin edge portion and the second skin edge portion, moving the front garnish and the rear garnish toward the central side of the headrest so as to cause the first and rear garnishes to approach to each other, and fixedly connecting the front garnish and the rear garnish to each other.

Accordingly, it is possible to perform work for attaching the garnish to the through-hole of the skin material easily, as compared with the conventional construction in which the insertion piece portion of the garnish is inserted in the opening of the skin member at the depth portion of the through-hole of the skin member.

The opening is formed between the skin edge portions forming the through-hole of the skin member. In various embodiments of the present invention, however, it is possible to seal the opening by the front garnish and the rear garnish according to a simple work of fixedly connecting the front garnish and the rear garnish to each other inside the through-hole.

Accordingly, the work for sealing the opening can be performed easily, as compared with the conventional construction in which the insertion piece portion of the garnish is inserted into the opening of the skin member over a whole periphery thereof.

According to a second aspect of an embodiment of the present invention, there is provided the bored headrest described in the first aspect, where at least one of the front garnish and the rear garnish is formed with a coupling portion which can be coupled to the frame. Therefore, the front garnish and the rear garnish can be firmly coupled to the frame. Thereby, since the front garnish and the rear garnish are prevented from deviating from a predetermined position regarding the frame, shape collapse or the like is prevented from occurring in the headrest.

According to a third aspect of an embodiment of the present invention, there is provided the bored headrest described in the first aspect, where a first skin edge portion engagement hole is formed at the first skin edge portion, a second skin edge portion engagement hole is formed at the second skin edge portion, a first engagement projection engaged with the first skin edge portion engagement hole is formed at the first holding portion, and a second engagement projection engaged with the second skin edge portion engagement hole is formed at the second holding portion. Therefore, the first skin edge portion and the second skin edge portion can be caused to engage with the front garnish and the rear garnish by such a very simple work that the first engagement projection is caused to engage with the first skin edge portion engagement hole and the second engagement projection is caused to engage with the second skin edge portion engagement hole.

Accordingly, work for sealing the opening can be performed easily, as compared with the conventional construction in which the insertion piece portion of the garnish is inserted into the opening of the skin member over a whole periphery thereof.

Since the first skin edge portion engagement hole, the second skin edge portion engagement hole, the first engagement projection, and the second engagement projection are formed at predetermined positions, attaching the garnish to the through-hole of the skin member can be preformed without positioning of the skin edge portions to the garnish and requiring skill for attaching work, which is required for the conventional headrest.

Accordingly, since fluctuation in treatment for holding the skin edge portions defining the opening can be prevented from occurring according to skills of individual workers, it is possible to prevent wrinkles, slack portions or the like from occurring at the skin edge portions of the skin member defining the opening.

According to a fourth aspect of an embodiment of the present invention, there is provided the bored headrest described in the first aspect, where the skin member is formed with a resin pouring port for pouring foaming resin, and the cushion member is formed by causing foaming resin poured from the resin pouring port inside the skin member to foam in a state that the opening has been sealed by the front garnish and the rear garnish, so that the cushion member is formed.

Since the cushion member can be formed by causing foaming resin poured from the resin pouring port inside the skin member to form in the state that the opening has been sealed by the front garnish and the rear garnish, the cushion member can be formed around the frame and inner member(s) arranged inside the skin member without leaving any gap or clearance, as compared with the construction in which a cushion member molded in a predetermined shape is inserted and arranged inside the skin member. Thereby, it is possible to form the headrest in a desired shape.

According to a fifth aspect of an embodiment of the invention, it is preferable that the headrest according to any one of the first to fourth aspects is applied to a seat for a vehicle.

According to a sixth aspect of an embodiment of the invention, the problem can be solved by providing a method for manufacturing a bored headrest where a cushion member and a frame are covered with a skin member having a through-hole extending in front and rear directions of the headrest, and a front garnish and a rear garnish are attached to the through-hole from the front and rear directions, comprising: a frame arranging step of arranging the frame inside the skin member; a skin edge portion holding step of causing a first skin edge portion and a second skin edge portion which form the through-hole to hold the front garnish and the rear garnish; a garnish attaching step of moving the front garnish and the rear garnish toward a central portion of the headrest so as to approach to each other, fixedly connecting the front garnish and the rear garnish to each other and sealing the opening formed between the first skin edge portion and the second skin edge portion utilizing the front garnish and the rear garnish; and a cushion member forming step of pouring foaming resin inside the skin member to cause the foaming resin to foam, thereby forming the cushion member inside the skin member.

According to the above method, the garnishes can be attached to the through-hole of the skin member by only causing the front garnish and the rear garnish to hold the first skin edge portion and the second skin edge portion in a state that the first skin edge portion and the second skin edge portion has been pulled out to the outside and moving the front garnish and the rear garnish toward a central portion of the headrest so as to approach to each other in the engaged state, thereby fixedly connecting them to each other.

Accordingly, work for attaching the garnish to the through-hole of the skin member can be performed easily, as compared with the conventional method where the insertion piece portion of the garnish is inserted into the opening of the skin member at a depth position of the through-hole of the skin member.

In this aspect, it is possible to seal the opening utilizing the front garnish and the rear garnish by only fixedly connecting the front garnish and the rear garnish to each other inside the through-hole.

Accordingly, work for sealing the opening can be performed easily, as compared with the conventional method that the insertion piece portion of the garnish is inserted into the opening of the skin member over a whole periphery thereof.

In the method for manufacturing a headrest according to various embodiments of the present invention, after the garnish attaching step has been performed, forming resin is poured inside the skin member and the cushion member is formed inside the skin member by causing the foaming resin to foam.

Accordingly, the cushion member can be formed around the frame arranged inside the skin member without leaving any gap or clearance, as compared with a case that a cushion member molded in a predetermined shape is inserted and arranged inside the skin member. Accordingly, the headrest can be formed in a desired shape.

According to a seventh aspect of an embodiment of the invention, there is provided the method for manufacturing the bored headrest described in the sixth aspect, where at least one of the front garnish and the rear garnish is coupled to the frame in the garnish attaching step. Therefore, the front garnish and the rear garnish can be firmly fixed to the frame. Thereby, since the front garnish and the rear garnish can be prevented from deviating from a predetermined position regarding the frame, shape collapse or the like can be prevented from occurring in the headrest.

According to an eighth aspect of an embodiment of the present invention, there is provided the method for manufacturing a bored headrest described in the sixth aspect, where a first engagement projection formed on the front garnish is caused to engage with a first skin edge portion engagement hole formed at the first skin edge portion and a second engagement projection formed on the rear garnish is caused to engage with a second skin edge portion engagement hole formed at the second skin edge portion in the skin edge portion holding step. Therefore, the first skin edge portion and the second skin edge portion can be caused to hold the front garnish and the rear garnish by such very simple work, respectively. Accordingly, it is possible to perform the work for sealing the opening simply, as compared with the conventional method where the insertion piece portion of the garnish is inserted into the opening of the skin member over the whole periphery thereof.

Since the first skin edge portion engagement hole, the second skin edge portion engagement hole, the first engagement projection, and the second engagement projection are formed at predetermined positions, attaching of the garnish to the through-hole of the skin member can be performed without positioning of the skin edge portions to the garnish and requiring skill for attaching work, which is required for the conventional method.

Accordingly, since fluctuation in treatment for holding the skin edge portions defining the opening can be prevented from occurring according to skills of individual workers, it is possible to prevent wrinkles, slack portions or the like from occurring at the skin edge portions of the skin member defining the opening.

According to embodiments of the present invention, since the work for attaching the garnishes to the through-hole of the skin member can be performed easily as compared with the conventional art, fluctuation can be prevented from occurring in finishing of the skin edge portion defining the opening according to skills of individual workers. Thereby, it is possible to keep qualities of appearances of headrests produced constant.

According to embodiments of the present invention, since wrinkles, slack portions or the like can be prevented from occurring at the skin edge portions defining the opening of the skin member, quality of appearance of the headrest can be improved.

BRIEF DESCRIPTION OF THE DRAWINGS

Various embodiments of the invention are illustrated below in the drawing figures.

DETAILED DESCRIPTION OF THE PREFERRED EMBODIMENTS

One embodiment of the present invention will be explained with reference to the drawings. In the following explanation, members, arrangements, and the like are not to be construed as limiting the present invention—these can be modified or changed variously within the spirit and scope of the invention.

Figure 1:
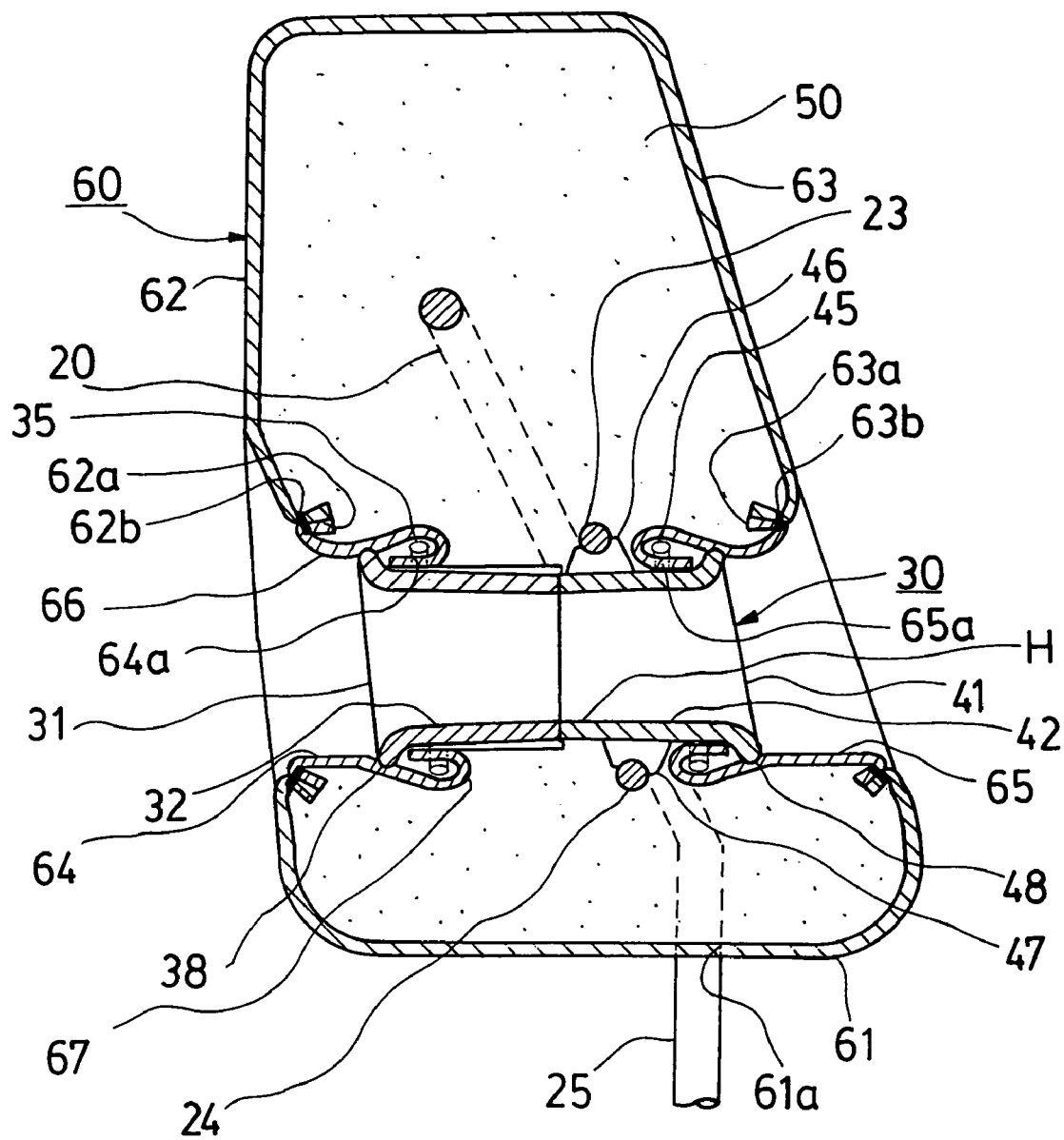
FIG. 1 is a side cross-sectional view showing a constitution of a headrest according to an embodiment of the present invention.
Figure 2:
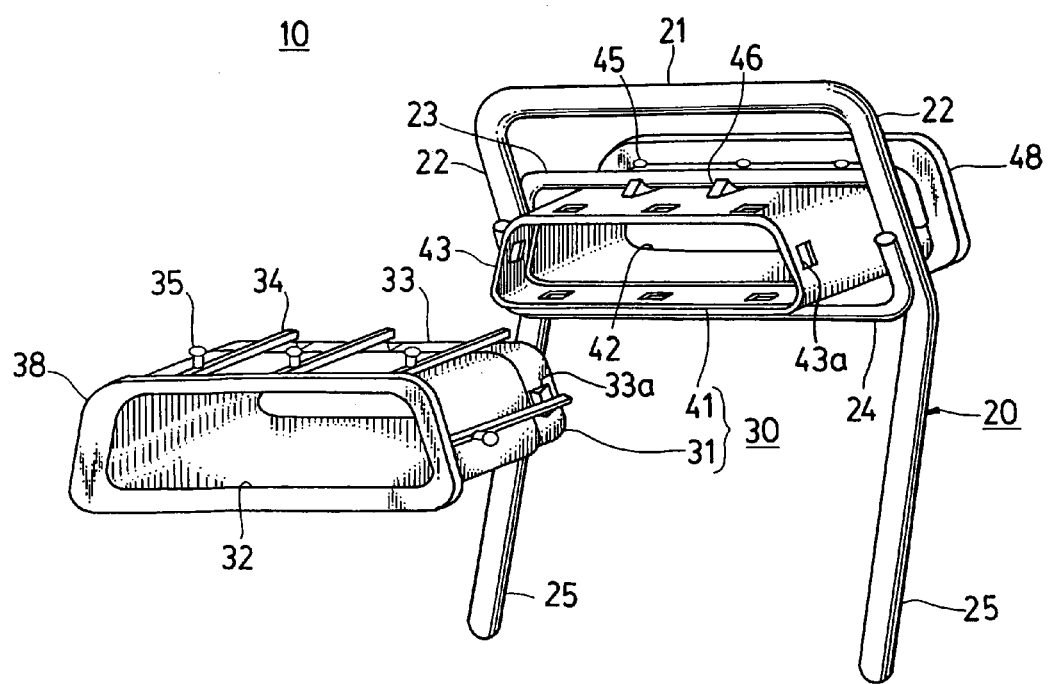
FIG. 2 is an exploded perspective view of the headrest according to the embodiment of the present invention.
Figure 3:
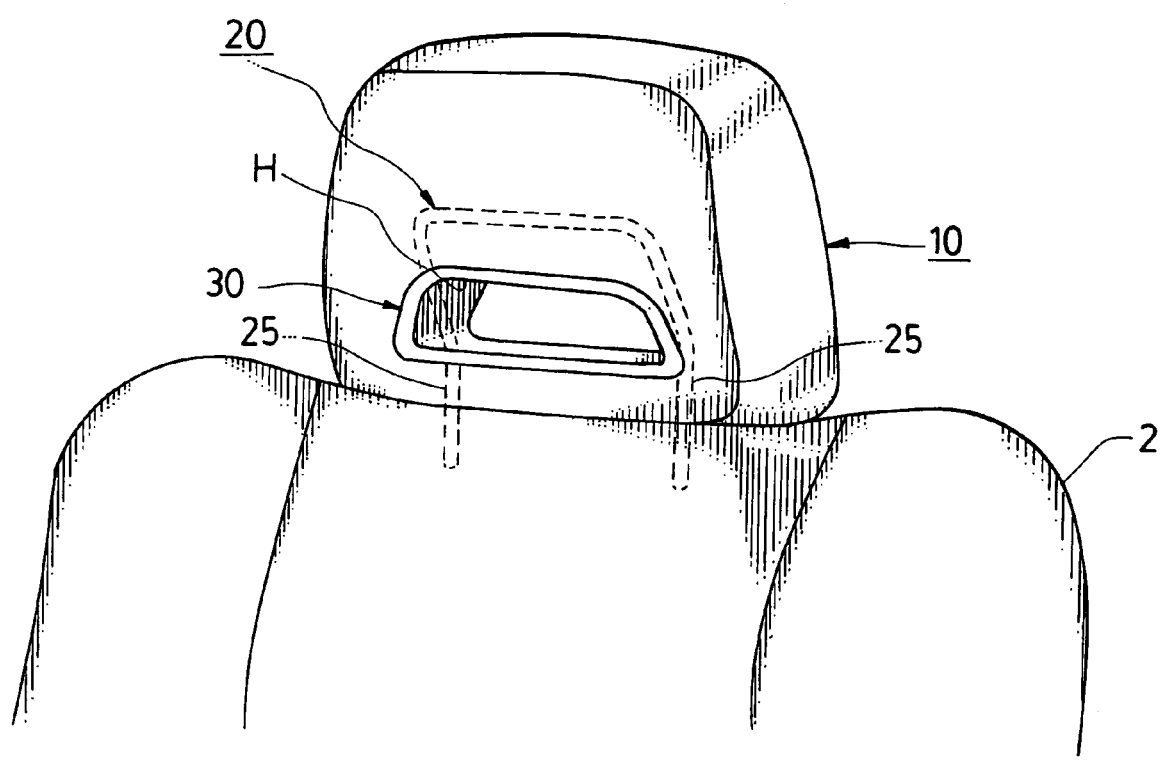
FIG. 3 is a partial perspective view of a seat for a vehicle including the headrest according to the embodiment of the present invention.
Figure 4:
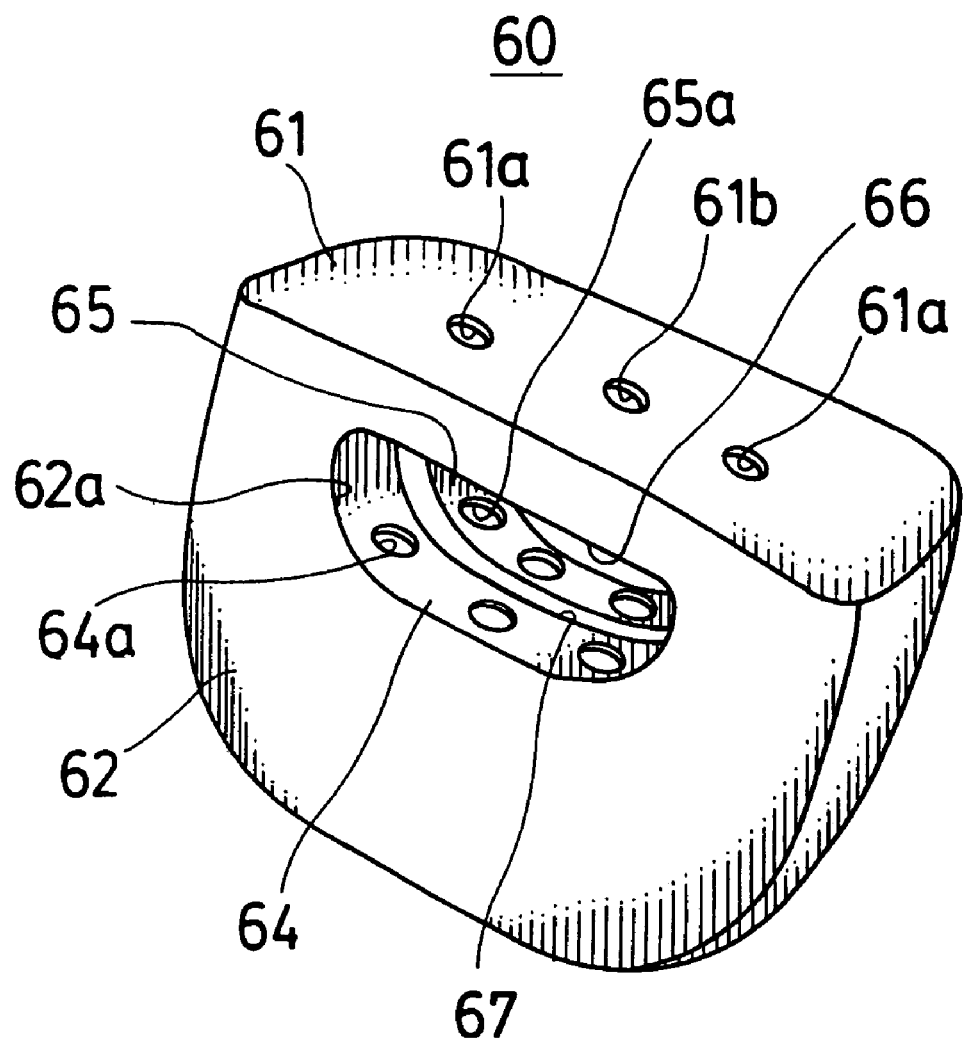
FIG. 4 is a perspective view showing a constitution of a skin member according to the embodiment of the present invention.
Figure 5:
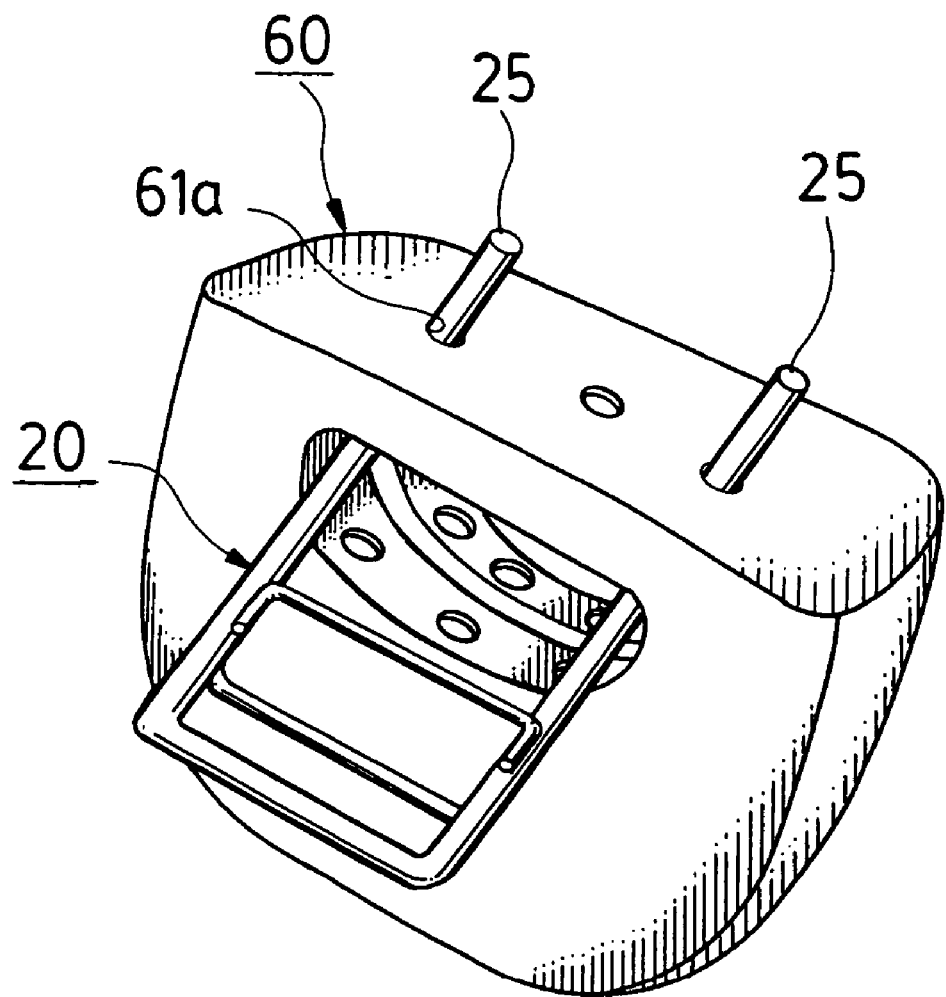
FIG. 5 is a perspective explanatory view showing an aspect of arranging a frame inside the skin member according to the embodiment of the present invention.
Figure 6:
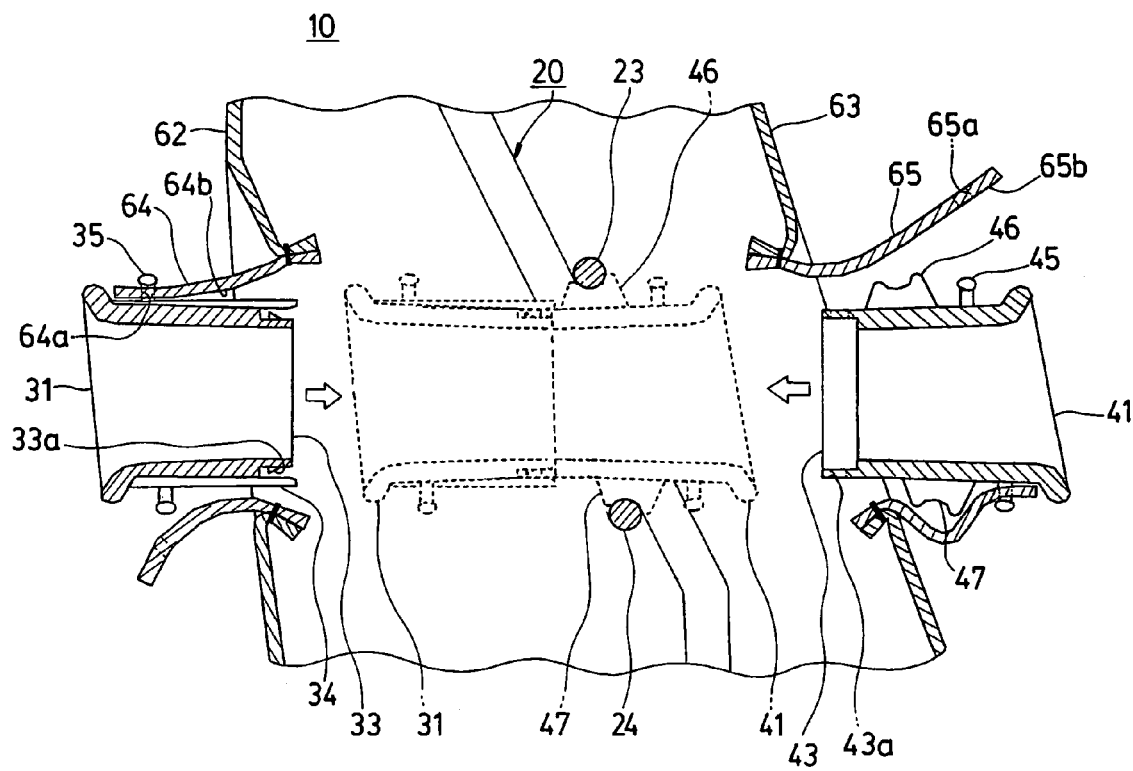
FIG. 6 is a cross-sectional explanatory view showing an aspect of attaching garnishes to a through-hole of the skin member according to the embodiment of the present invention.
Figure 7:
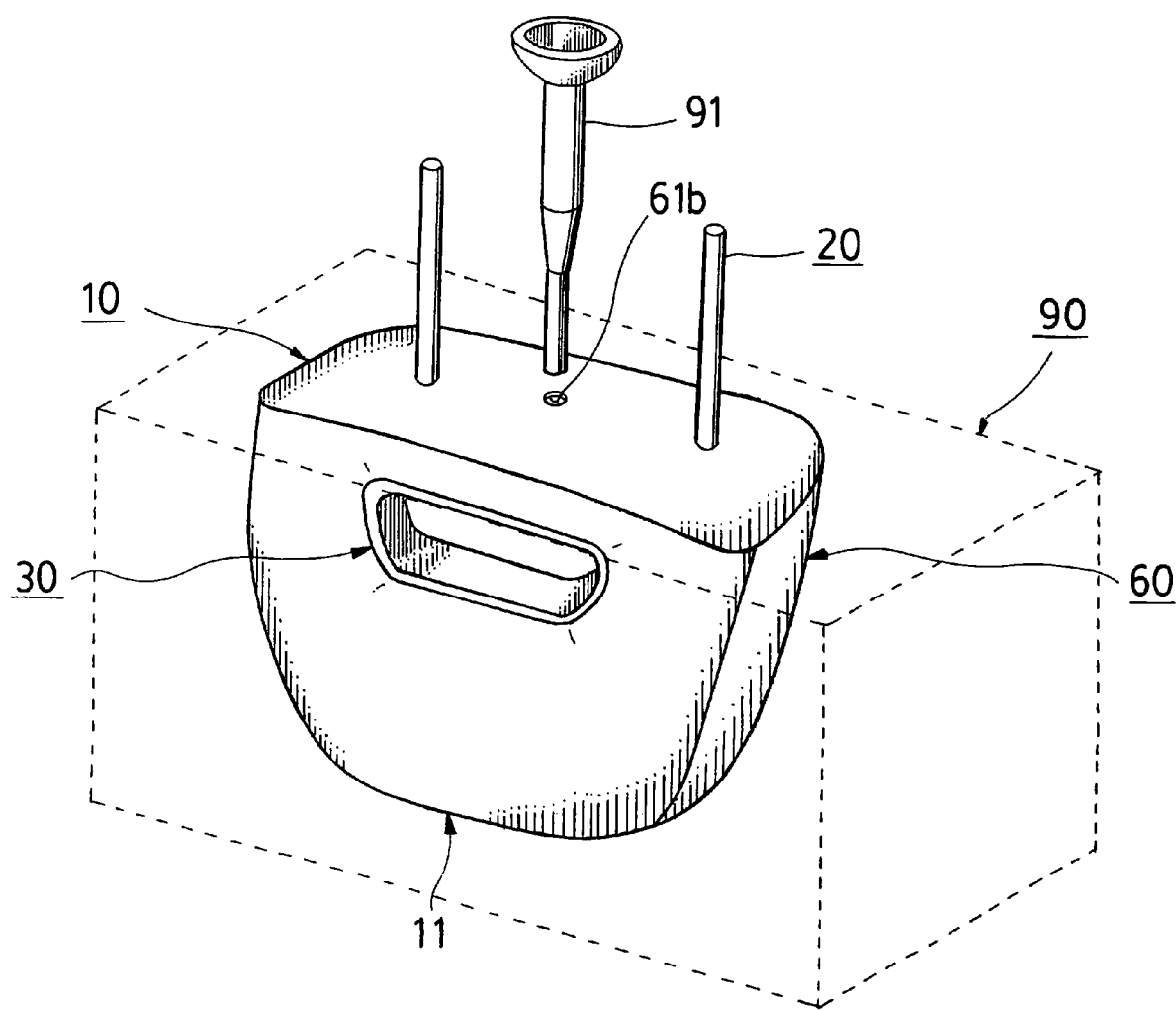
FIG. 7 is a perspective explanatory view showing an aspect of pouring foaming resin inside the skin member according to the embodiment of the present invention.

FIGS. 1 to 7 are views showing one embodiment of the present invention. FIG. 1 is a side sectional view showing a construction of a headrest, FIG. 2 is an exploded perspective view of the headrest, FIG. 3 is a view showing a construction of a seat for a vehicle including the headrest, FIG. 4 is a perspective view showing a construction of a skin member, FIG. 5 is an explanatory view showing an aspect of arranging a frame inside the skin member, FIG. 6 is an explanatory view showing an aspect of attaching garnishes to a through-hole of the skin member, and FIG. 7 is an explanatory view showing an aspect of pouring foaming resin inside the skin member.

First of all, a headrest 10 according to one embodiment of the present invention will be explained with reference to FIGS. 1 to 4.

The headrest 10 according to the embodiment of the present invention is of a so-called bored type, and it is preferably used as a headrest of a seat 1 for a vehicle provided in such a vehicle as a passenger automobile. The headrest 10 of the embodiment includes a frame 20, a garnish 30, a cushion member 50, and a skin member 60.

As shown in FIG. 2, the frame 20 is formed with a horizontal rod portion 21 extending in an approximately horizontal direction and inclined rod portions 22 and 22 inclined obliquely downward are integrally formed at both ends of the horizontal rod portion 21.

The inclined rod portion 22 on the right side and the inclined rod portion 22 on the left side are connected to each other by a pair of coupling rod portions 23 and 24 which are arranged above and below in parallel to extend in a horizontal direction, and vertical rod portions 25 and 25 extending in a vertical direction are integrally formed at ends of the inclined rod portions 22 and 22.

As shown in FIG. 3, extended ends of the vertical rod portions 25 and 25 are fixed to a mounting portion (not shown) provided at an upper end of a seatback 2 of the seat 1 for a vehicle. Thereby, the headrest 10 of the embodiment is fixed at an upper portion of the seatback 2 of the seat 1 for a vehicle.

As shown in FIG. 1, the garnish 30 is attached to a through-hole 66 formed in the skin member 60 for sealing an opening 67 of the skin member 60. As shown in FIG. 2, the garnish 30 of the embodiment has a divisional structure having a front garnish 31 and a rear garnish 41.

The front garnish 31 is constructed so as to conform with a shape of the through-hole 66 formed in the skin member 60, and it has, inside, a hole portion 32 extending through the same in front and rear directions.

A raised first connecting portion 33 having a plurality of (for example, eight) engagement projections 33a is formed on the front garnish 31 on a near side thereof to the rear garnish 41. The first connecting portion 33 is inserted into and connected to a second connecting portion 43 of the rear garnish 41 described later so that the engagement projections 33a are engaged with engagement holes 43a of the second connecting portion 43.

A plurality of (for example, eight) ribs 34, each being a ridged stripe body extending in front and rear directions, are formed on an outer peripheral face of the front garnish 31. Distal ends of the ribs 34 project toward the rear garnish 41, respectively.

With this construction, the distal ends of the plurality of ribs 34 grasp a portion of the rear garnish 41 which is positioned near to the front garnish 31 in a state that the front garnish 31 is fixedly connected to the rear garnish 41 (see FIG. 6)

First engagement projections 35 serving as first holding portions projecting in a direction approximately perpendicular to the outer peripheral face of the front garnish 31 are formed on the ribs 34 (for example, eight)

As shown in FIG. 1, the first engagement projections 35 are caused to engage with first skin edge portion engagement holes 64a formed in the skin members 60.

A first wall portion 38 extending outwardly to the outer peripheral face of the front garnish 31 is formed on an end portion of the front garnish 31 which is positioned at a far side from the rear garnish 41.

The first wall portion 38 is for expanding the first skin edge portion 64 of the skin member 60 in a radial direction outwardly and concealing a treated portion of the first skin edge portion 64 positioned inside the through-hole 66 so as not to be viewable from the outside.

The rear garnish 41 is constructed to be approximately symmetrical to the front garnish 31, and it has, inside, a hole portion 42 extending through the same in front and rear direction.

As shown in FIG. 2, a recess-shaped second connecting portion 43 having engagement holes 43a at positions matching with the engagement projections 33a are formed on a portion of the rear garnish 41 which is positioned near to the front garnish 31.

In the embodiment, the front garnish 31 and the rear garnish 41 are fixed integrally by causing the engagement projections 33a to engage with the engagement holes 43a in such a state that the first connecting portion 33 has been inserted into and connected to the second connecting portion 43.

A plurality of (for example, eight) second engagement projections 45 serving as second holding portions projecting in a direction approximately perpendicular to an outer peripheral face of the rear garnish 41 are formed on the outer peripheral face of the rear garnish 41. As shown in FIG. 1, the second engagement projections 45 are caused to engage with second skin edge portion engagement holes 65a formed at the skin member 60.

First engagement portions 46 extending in a direction approximately perpendicular to an upper face portion of the rear garnish 41 are formed on the upper face portion of the rear garnish 41, and second engagement portions 47 extending in a direction perpendicular to a lower face portion of the rear garnish 41 are formed on the lower face portion.

The first engagement portions 46 and the second engagement portions 47 (corresponding to a coupling portion in the present invention) are for connecting the rear garnish 41 to the frame 20, and they can be engaged with the coupling rod portions 23 and 24 provided on the frame 20.

A second wall portion 48 extending in a direction approximately perpendicular to an outer peripheral face of the rear garnish 41 is formed at an end of the rear garnish 41 which is positioned on a far side from the front garnish 31.

As shown in FIG. 1, the second wall portion 48 is for expanding a second skin edge portion 65 of the skin member 60 in a radial direction outwardly and concealing a treated portion of the second skin edge portion 65 positioned inside the through-hole 66 so as not to be viewable from the outside.

The cushion member 50 is made from a foamed resin material such as urethane. The cushion member 50 in the embodiment encloses an upper portion of the frame 20 and it is covered with the skin member 60. Incidentally, the cushion member 50 is formed by a foaming process utilizing a molding apparatus 90.

The skin member 60 is for covering the cushion member 50, and it is formed in an almost bag shape with a predetermined cubic shape, as shown in FIG. 4. The skin member 60 in the embodiment may be formed of, for example, pure hide, synthetic leather, fabric, or the like.

As shown in FIGS. 1 and 4, pillar holes 61a which allow insertion of the vertical rod portions 25 of the frame 20 and a resin pouring port 61b for pouring the stock solution of foaming resin inside the skin member 60 are formed in a bottom skin 61 of the skin member 60.

A hole portion 62a is formed on a front skin 62, and a hole portion 63a is formed on a rear skin 63. The first skin edge portion 64 is sewed on a peripheral portion of the front skin 62 defining the hole portion 62a by a suture thread 62b and the second skin edge portion 65 is sewed on a peripheral portion of the rear skin 63 defining the hole portion 63a by a suture thread 63b.

In the embodiment, the first skin edge portion 64 is formed in a cylindrical shape by sewing the first skin edge portion 64 along the peripheral portion of the front skin 62 defining the hole portion 62a, and the second skin edge portion 65 is also formed in a cylindrical shape by sewing the second skin edge portion 65 along the peripheral portion of the rear skin 63 defining the hole portion 63a.

Since the first skin edge portion 64 and the second skin edge portion 65 are each formed in a cylindrical shape in this manner, the through-hole 66 is formed along the front and rear directions of the skin member 60.

In the embodiment, the first skin edge portion 64 formed in a cylindrical shape and the second skin edge portion 65 formed in a cylindrical shape like the first skin edge portion 64 are constructed to be separated from each other.

With this construction, an annular opening 67 is formed between the first skin edge portion 64 and the second skin edge portion 65 along a circumferential direction of the through-hole 66. The opening 67 has such a size that the frame 20 can be inserted into the skin member 60.

A plurality of (for example eight) first skin edge portion engagement holes 64a are formed in the first skin edge portion 64. Similarly, a plurality of (for example, eight) second skin edge portion engagement holes 65a are formed in the second skin edge portion 65.

The first skin edge portion engagement holes 64a are formed at positions corresponding to the first engagement projections 35 provided on the front garnish 31, and the second skin edge portion engagement holes 65a are formed at positions corresponding to the second engagement projections 45 provided on the rear garnish 41

A method for manufacturing the headrest 10 thus constructed is explained below.

As shown in FIG. 5, first, the vertical rod portions 25 of the frame 20 are inserted into the pillar holes 61a formed on the bottom skin 61 of the skin member 60, respectively. Subsequently, an upper portion of the frame 20 is covered with the skin member 60 by inserting the upper portion of the frame 20 from the opening 67 of the skin member 60.

As described above, the first skin edge portion 64 is reversed in the state that the upper portion of the frame 20 has been covered with the skin member 60 to be pulled out to the outside of the front skin 62, as shown in FIG. 6. Similarly, the second skin edge portion 65 is also reversed to be pulled out to the outside of the rear skin 63.

Then, the first skin edge portion 64 and the second skin edge portion 65 are assembled to the front garnish 31 and the rear garnish 41 in the state that the first skin edge portion 64 and the second skin edge portion 65 have been reversed and pulled out to the outside.

At that time, the front garnish 31 is inserted and arranged inside the cylindrical first skin edge portion 64, and the first engagement projections 35 of the front garnish 31 are sequentially inserted from a back face 64b of the first skin edge portion 64 and engaged with the first skin edge portion engagement holes 64a at the first skin edge portion 64. Thereby, the first skin edge portion 64 is held by the front garnish 31.

Similarly, the rear garnish 41 is inserted and arranged inside the cylindrical second skin edge portion 65, and the second engagement projections 45 of the rear garnish 41 are sequentially inserted from a back face 65b of the second skin edge portion 65 and engaged with the second skin edge portion engagement holes 65a of the second skin edge portion 65. Thereby, the second skin edge portion 65 is held by the rear garnish 41.

The first skin edge portion 64 and the second skin edge portion 65 are respectively held by the front garnish 31 and the rear garnish 41 according to such a very simple work as to cause the first engagement projections 35 and the second engagement projections 45 to engage with the first skin edge portion engagement holes 64a and the second skin edge portion engagement holes 65a, respectively.

Subsequently, the front garnish 31 and the rear garnish 41 are slid toward a central portion of the headrest 10 so as to approach to each other in a state that the first skin edge portion 64 has been held by the front garnish 31 and the second skin edge portion 65 has been held by the rear garnish 41.

Thereby, the reversed first skin edge portion 64 and the reversed second skin edge portion 65 are pushed inside the skin member 60 while they are gradually being restored to their obverse sides.

The first connecting portion 33 of the front garnish 31 is inserted into and connected to the second connecting portion 43 of the rear garnish 41, and the engagement projections 33a formed on the first connecting portion 33 are caused to engage with the engagement holes 43a formed in the second connecting portion 43.

By fixedly connecting the front garnish 31 to the rear garnish 41 in the above manner, the distal ends of the ribs 34 hold an end portion of the rear garnish 41 positioned on a near side to the front garnish 31. Thereby, the front garnish 31 and the rear garnish 41 are firmly fixed to each other, as shown by a dashed line in FIG. 6.

As described above, by sliding the rear garnish 41 toward the central side of the headrest 10, the first engagement portions 46 and the second engagement portions 47 formed on the rear garnish 41 are caused to engage with the coupling rod portions 23 and 24.

Thereby, the garnish 30 is firmly fixed to the frame 20. The first skin edge portion 64 and the second skin edge portion 65 are put in a state that they have been pulled toward the central side of the headrest 10 (see FIG. 1).

A through-hole H extending through the headrest 10 in front and rear directions of a vehicle is constituted by the through-hole 66 formed by the first skin edge portion 64 and the second skin edge portion 65, the hole portion 32 of the front garnish 31, and the hole portion 42 of the rear garnish 41 (see FIGS. 1 and 3). Further, the opening 67 is sealed by an annular main portion of the garnish 30. Thus, attaching the garnish 30 to the through-hole 66 of the skin member 60 can be conducted by simply causing the first engagement projections 35 and the second engagement projections 45 to engage with the first skin edge portion engagement holes 64a and the second skin edge portion engagement holes 65a in a state that the first skin edge portion 64 and the second skin edge portion 65 have been pulled out to the outside and sliding the front garnish 31 and the rear garnish 41 toward the central side of the headrest 10 so as to cause them to approach to each other to connect and fix them.

Accordingly, work for attaching of the garnish 30 to the through-hole 66 of the skin member 60 can be performed easily, as compared with the conventional case that the insertions piece portion of the garnish is inserted into the opening of the skin member at a depth portion of the through-hole of the skin member.

Though the opening 67 is formed at the skin edge portions of the skin member 60 forming the through-hole 66, the opening 67 can be sealed using the front garnish 31 and the rear garnish 41 by only connecting and fixing the front garnish 31 and the rear garnish 41 to each other inside the through-hole 66.

Accordingly, work for sealing the opening 67 can be performed easily, as compared with the conventional construction in which the insertion piece portion of the garnish is inserted into the opening of the skin member over a whole periphery thereof.

In the embodiment, since the first skin edge portion engagement holes 64a, the second skin edge portion engagement holes 65a, the first engagement projections 35, and the second engagement projections 45 are formed at predetermined positions, attaching of the garnish 30 to the through-hole 66 of the skin member 60 can be performed without positioning of the first skin edge portion 64 and the second skin edge portion 65 to the garnish 30 and requiring a high level of skill for attaching work.

Accordingly, since fluctuation in treatment for holding the first skin edge portion 64 and the second skin edge portion 65 can be prevented from occurring according to skill of individual workers, it is possible to prevent wrinkles, slack portions or the like from occurring at the skin edge portions of the skin member 60 defining the opening.

In the embodiment, since the rear garnish 41 is coupled to the frame 20, the front garnish 31 and the rear garnish 41 can be firmly fixed to the frame 20.

Accordingly, the front garnish 31 and the rear garnish 41 can be prevented from deviating from a predetermined position regarding the frame 20, shape collapse or the like can be prevented from occurring in the headrest 10.

As described above, treated portions of the first skin edge portion 64 and the second skin edge portion 65 of the skin member 60 are concealed so as not to be visible from the outside by the first wall portion 38 of the front garnish 31 and the second wall portion 48 of the rear garnish 41 in a state that the front garnish 31 and the rear garnish 41 have been attached to the through-hole 66 of the skin member 60. Accordingly, appearance of the through-hole H of the headrest 10 can be improved.

As described above, the main unit 11 of the headrest 10 is set in a mold section (not shown) of the molding apparatus 90 in a state that the frame 20 has been covered with the skin member 60 and the garnish 30 has been attached to the through-hole 66 of the skin member 60, as shown in FIG. 7. Incidentally, the mold portion (not shown) of the molding apparatus 90 is formed so as to mold the main unit 11 of the headrest 10 in a predetermined shape.

A resin pouring nozzle 91 is inserted into the resin pouring port 61b, and stock solution of foaming resin such as urethane is poured from the resin pouring nozzle 91 inside the skin member 60 by a predetermined amount.

Subsequently, the cushion member 50 is formed by foaming the stock solution of the foaming resin poured inside the skin member 60. Thereby, the frame 20, the garnish 30, the cushion member 50, and the skin member 60 are formed integrally, so that the headrest 10 is formed (see FIG. 1).

As described above, after the frame 20, the garnish 30, the cushion member 50, and the skin member 60 are formed or assembled integrally, a mold opening of the molding apparatus 90 is performed to take out the headrest 10 from the molding apparatus 90. Manufacturing of the headrest 10 according to the embodiment is completed in this manner.

In the embodiment, after the opening 67 is sealed by attaching the garnish 30 to the headrest 10 in this manner, the cushion member 50 is formed by pouring foaming resin inside the skin member 60 and foaming the forming resin.

Accordingly, the cushion member 50 can be formed around the frame 20 arranged inside the skin member 60 without leaving any gap or clearance, as compared with a case that a cushion member molded in a predetermined shape is inserted and arranged inside the skin member. Accordingly, the headrest 10 can be formed in a desired shape.

As described in detail, according to the embodiment, the garnish 30 can be attached to the through-hole 66 of the skin member 60 by a simple work of pulling out the first skin edge portion 64 and the second skin edge portion 65 to the outside once, causing the front garnish 31 and the rear garnish 41 to hold the first skin edge portion 64 and the second skin edge portion 65 from their pulled-out states, respectively, moving the front garnish 31 and the rear garnish 41 toward the central side of the headrest 10 to cause them to approach to each other, and connecting and fixing the front garnish 31 and the rear garnish 41 to each other.

Accordingly, work for attaching the garnish 30 to the through-hole 66 of the skin member 60 can be performed easily, as compared with the conventional work.

The opening 67 is formed at the skin edge portions forming the through-hole 66 of the skin member 60. In the embodiment, however, the opening 67 can be sealed by the front garnish 31 and the rear garnish 41 according to the simple work of connecting and fixing the front garnish 31 and the rear garnish 41 to each other inside the through-hole 66.

Accordingly, the work for sealing the opening 67 can be performed easily, as compared with the conventional construction in which the insertion piece portion of the garnish is inserted into the opening of the skin member over a whole periphery thereof. Thereby, since fluctuation can be prevented from occurring in finishing of the skin edge portions defining the opening according to skills of individual workers, it is possible to keep qualities of appearances of headrests 10 produced constant.

According to the embodiment, since fluctuation in treatment for holding the first skin edge portion 64 and the second skin edge portion 65 can be prevented from occurring according to the skill of individual workers, it is possible to prevent wrinkles, slack portions or the like from occurring at the skin member 60 defining the opening. Thereby, quality of appearance of the headrest 10 can be improved.

In the embodiment, though the opening 67, of the skin member 60 is sealed by both of the front garnish 31 and the rear garnish 41, the present invention is not limited to this construction. Besides, such a construction may be adopted that the opening 67 is sealed by either one of the front garnish 31 and the rear garnish 41.

In the embodiment, though the construction in which the rear garnish 41 is coupled to the frame 20 by the first engagement portions 46 and the second engagement portions 47 is adopted, the present invention is not limited to this constitution. Besides, such a constitution may be adopted that the front garnish 31 is coupled to the frame 20, or such a constitution may be adopted that both of the front garnish 31 and the rear garnish 41 are coupled to the frame 20.

In the embodiment, though the construction in which the first skin edge portion 64 is held to the front garnish 31 by causing the first engagement projections 35 to engage with the first skin edge portion engagement holes 64a and similarly causing the second engagement projections 45 to engage with the second skin edge portion engagement holes 65a is adopted, the present invention is not limited to this construction.

In addition, for example, such a construction may be adopted that the first skin edge portion 64 and the second skin edge portion 65 are held to the front garnish 31 and the rear garnish 41 using a hook and loop fastener or the like. That is, the first holding portion and the second holding portion according to the present invention are not limited to the construction having the engagement projections.

Such a construction may be adopted that engagement projections are respectively formed on the first skin edge portion 64 and the second skin edge portion 65 and engagement holes are respectively formed in the front garnish 31 and the rear garnish 41 so that the first skin edge portion 64 and the second skin edge portion 65 are held to the front garnish 31 and the rear garnish 41 by engagement of these members.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware components configured to perform the specified functions. Furthermore, the present invention could employ any number of conventional techniques for configuration. The particular implementations shown and described herein are illustrative examples of the invention and are not intended to otherwise limit the scope of the invention in any way. For the sake of brevity, conventional structural and functional aspects of the systems (and components of the individual operating components of the systems) may not be described in detail. Furthermore, the connection lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. A bored headrest, comprising:
    a cushion member;
    a frame;
    a skin member that covers the cushion member and frame, the skin member having a through-hole extending in front and rear directions of the headrest;
    a front garnish and a rear garnish that are attached to the through-hole from the front and rear directions;
wherein:
    an opening is formed at skin edge portions forming the through-hole of the skin member along a circumferential direction of the through-hole;
    the front garnish has a first holding portion which can hold a first skin edge portion which is one of the skin edge portions between which the opening is interposed;
    the rear garnish has a second holding portion which can hold a second skin edge portion which is the other of the skin edge portions between which the opening is interposed;
    the front garnish and the rear garnish are fixedly connected to each other inside the through-hole to seal the opening;
    a first skin edge portion engagement hole is formed at the first skin edge portion;
    a second skin edge portion engagement hole is formed at the second skin edge portion;
    a first engagement projection engaged with the first skin edge portion engagement hole is formed at the first holding portion; and
    a second engagement projection engaged with the second skin edge portion engagement hole is formed at the second holding portion.

2. A bored headrest, comprising:
    a cushion member;
    a frame;
    a skin member that covers the cushion member and frame, the skin member having a through-hole extending in front and rear directions of the headrest;
    a front garnish and a rear garnish that are attached to the through-hole from the front and rear directions;
wherein:
    an opening is formed at skin edge portions forming the through-hole of the skin member along a circumferential direction of the through-hole;
    the front garnish has a first holding portion which can hold a first skin edge portion which is one of the skin edge portions between which the opening is interposed;
    the rear garnish has a second holding portion which can hold a second skin edge portion which is the other of the skin edge portions between which the opening is interposed;
    the front garnish and the rear garnish are fixedly connected to each other inside the through-hole to seal the opening;
    the skin member is formed with a resin pouring port for pouring foaming resin; and
    the cushion member is formed by causing foaming resin poured from the resin pouring port inside the skin member to foam in a state that the opening has been sealed by the front garnish and the rear garnish.

3. A seat for a vehicle, comprising:
    a bored headrest, comprising:
        a cushion member;
        a frame;
        a skin member that covers the cushion member and frame, the skin member having a through-hole extending in front and rear directions of the headrest;
        a front garnish and a rear garnish that are attached to the through-hole from the front and rear directions;
    wherein:
    an opening is formed at skin edge portions forming the through-hole of the skin member along a circumferential direction of the through-hole;
    the front garnish has a first holding portion which can hold a first skin edge portion which is one of the skin edge portions between which the opening is interposed;
    the rear garnish has a second holding portion which can hold a second skin edge portion which is the other of the skin edge portions between which the opening is interposed;

the front garnish and the rear garnish are fixedly connected to each other inside the through-hole to seal the opening;
a first skin edge portion engagement hole is formed at the first skin edge portion;
a second skin edge portion engagement hole is formed at the second skin edge portion;
a first engagement projection engaged with the first skin edge portion engagement hole is formed at the first holding portion; and
a second engagement projection engaged with the second skin edge portion engagement hole is formed at the second holding portion.

4. A seat for a vehicle, comprising:
a bored headrest, comprising:
  a cushion member;
  a frame;
  a skin member that covers the cushion member and frame, the skin member having a through-hole extending in front and rear directions of the headrest;
  a front garnish and a rear garnish that are attached to the through hole from the front and rear directions;
wherein:
an opening is formed at skin edge portions forming the through-hole of the skin member along a circumferential direction of the through-hole;
the front garnish has a first holding portion which can hold a first skin edge portion which is one of the skin edge portions between which the opening is interposed;
the rear garnish has a second holding portion which can hold a second skin edge portion which is the other of the skin edge portions between which the opening is interposed;
the front garnish and the rear garnish are fixedly connected to each other inside the through-hole to seal the opening;
the skin member is formed with a resin pouring port for pouring foaming resin; and
the cushion member is formed by causing foaming resin poured from the resin pouring port inside the skin member to foam in a state that the opening has been sealed by the front garnish and the rear garnish.

5. A method for manufacturing a bored headrest, comprising:
covering a cushion member and a frame with a skin member having a through-hole extending in front and rear directions of the headrest;
attaching a front garnish and a rear garnish to the through-hole from the front and rear directions;
arranging the frame inside the skin member;
arranging the front garnish and the rear garnish to hold a first skin edge portion and a second skin edge portion which form the through-hole;
moving the front garnish and the rear garnish toward a central side of the headrest so as to cause the front garnish and the rear garnish to approach to each other;
fixedly connecting the front garnish and the rear garnish to each other;
sealing an opening formed between the first skin edge portion and the second skin edge portion using the front garnish and the rear garnish; and
pouring foaming resin inside the skin member to cause the foaming resin to foam, thereby forming the cushion member inside the skin member.

6. The bored headrest according to claim 1, wherein at least one of the front garnish and the rear garnish is formed with a coupling portion which can be coupled to the frame.

7. The seat for a vehicle according to claim 3, wherein at least one of the front garnish and the rear garnish is formed with a coupling portion which can be coupled to the frame.

8. The method for manufacturing the bored headrest according to claim 5, further comprising:
coupling at least one of the front garnish and the rear garnish to the frame in the garnish attaching step.

9. The method for manufacturing a bored headrest according to claim 5, further comprising:
engaging a first engagement projection formed on the front garnish with a first skin edge portion engagement hole formed at the first skin edge portion; and
engaging a second engagement projection formed on the rear garnish with a second skin edge portion engagement hole formed at the second skin edge portion in the arranging of the garnishes step.

10. The bored headrest according to claim 2, wherein at least one of the front garnish and the rear garnish is formed with a coupling portion which can be coupled to the frame.

11. The seat for a vehicle according to claim 4, wherein at least one of the front garnish and the rear garnish is formed with a coupling portion which can be coupled to the frame.

* * * * *